United States Patent [19]

Gachot

[11] 4,407,483
[45] Oct. 4, 1983

[54] BUTTERFLY VALVE

[76] Inventor: Jean Gachot, 26 bis, avenue de Paris, 95230 Soisy Sous Montmorency, France

[21] Appl. No.: 309,113

[22] Filed: Oct. 6, 1981

[30] Foreign Application Priority Data

Nov. 19, 1980 [FR] France .................. 80 24582

[51] Int. Cl.³ .......................................... F16K 51/00
[52] U.S. Cl. .................................... 251/287; 251/306
[58] Field of Search .............. 251/305, 306, 287, 286, 251/173

[56] References Cited

U.S. PATENT DOCUMENTS 3,176,704 4/1965 De Palma ................... 251/305 X
3,877,678 4/1975 Jung ........................... 251/305

FOREIGN PATENT DOCUMENTS 746909 1/1954 United Kingdom ............ 251/306
1216533 12/1970 United Kingdom .

Primary Examiner—Martin P. Schwadron
Assistant Examiner—Sheri M. Novack
Attorney, Agent, or Firm—Young & Thompson

[57] ABSTRACT

A butterfly valve disk is rotatably mounted within a passageway formed in the valve body and an annular seal fitted in the valve body projects within the passageway. A peripheral annular bearing surface formed on the valve disk is applied against the annular seal in the closed position. The valve disk carries a stop which is brought to bear on an internal surface of the valve in order to prevent rotational displacement of the valve disk beyond its normal position of closure.

7 Claims, 4 Drawing Figures

BUTTERFLY VALVE

This invention relates to an improved butterfly valve for piping systems, especially pipes and ducts which are intended to convey a fluid under high pressure or at high temperatures.

In a butterfly valve of known design as disclosed in French Pat. No. 2,038,438, for example, a "butterfly" closure element or valve disk is rotatably mounted within a cylindrical passageway formed in the valve body. The axis of rotation of said valve disk is perpendicular to the axis of the passageway. Furthermore, said valve disk is displaced laterally with respect to its axis of rotation.

In this design, the valve body is fitted with an annular seal which projects within the passageway. An annular bearing surface is provided at the periphery of the valve disk in order to bear on the seal in the closed position of the valve. The annular bearing surface of the valve disk is a portion of spherical surface, the axis of which is located substantially at the point of intersection of the axis of rotation of the valve disk and of the axis of the passageway.

In the majority of instances, seals of valves of this type are formed of polytetrafluoroethylene since this material affords resistance to high temperatures and has elastic properties within a limited range of mechanical stress.

Said seal of polytetrafluoroethylene has a frusto-conical internal sealing surface which is substantially tangent to the spherical annular bearing face of the valve disk in the closed position.

In this position, fluid-tightness is achieved by resilient application of the annular bearing surface of the valve disk against the frusto-conical surface of the seal. The force exerted by the annular bearing surface of the valve disk on the seal tends to increase when the valve disk is constrained to rotate in the direction of closing. When excessive force is applied in this direction, the polytetrafluoroethylene of the seal undergoes irreversible creep deformation. This is liable to cause damage to the seal which is then no longer fluid-tight.

Some types of butterfly valves are provided externally of the valve body with a stop which serves in principle to limit displacement of the valve-disk operating lever beyond a predetermined distance of angular travel. In order to be effective, however, the stop should be mounted with a very high degree of accuracy, which proves impossible to achieve in practice. Furthermore, it may happen that, after disassembly of the valve, the lever is remounted in a faulty manner, with the result that the stop would become ineffective in such a case.

The aim of this invention is to overcome the disadvantages mentioned in the foregoing by removing any attendant danger of damage to the seal of a butterfly valve in the event of accidental operation of the valve disk beyond its normal position of closure.

The butterfly valve contemplated by the invention comprises a valve body, a passageway within said body, and a closure valve-disk rotatably mounted within said passageway in such a manner as to be capable of rotating about an axis located at right angles to the axis of said passageway. The valve body is adapted to carry an annular seal which projects within the interior of the passageway. An annular bearing surface is formed at the periphery of the valve disk and is intended to bear on the seal in the closed position of the valve disk. The annular bearing surface of the valve disk is a portion of spherical surface, the axis of which is located substantially at the intersection of the axis of rotation of the valve disk and the axis of the passageway.

In accordance with the invention, the distinctive feature of the valve lies in the fact that the valve disk is adapted to carry a stop which is intended to bear on an internal surface of the valve in order to prevent rotation of the valve disk beyond its normal position of closure.

The position of said stop on the valve disk with respect to the valve body is defined once and for all at the time of construction of the valve. Thus, this position is not liable to be modified during successive operations involving assembly and reassembly of the valve.

The fact that said stop is placed on the valve disk is particularly judicious since this position does not give rise to any complication in the manufacture of the valve disk or to any interference with the flow of fluid within the valve passageway. This would not be the case if the stop were placed elsewhere, for example within the passageway of the valve body.

In an advantageous embodiment of the invention relating to the case in which the valve disk is displaced laterally with respect to its axis of rotation, the stop is formed on that face of the valve disk which is remote from its axis of rotation. Said stop thus forms a projection with respect to the sphere on which is located the spherical portion constituting the annular bearing surface of the valve disk.

By virtue of the fact that it projects from the sphere, the stop necessarily comes into contact with an internal surface of the valve which precedes the seal.

These and other features of the invention will be more apparent upon consideration of the following description and accompanying drawings, wherein.

Figure 2:
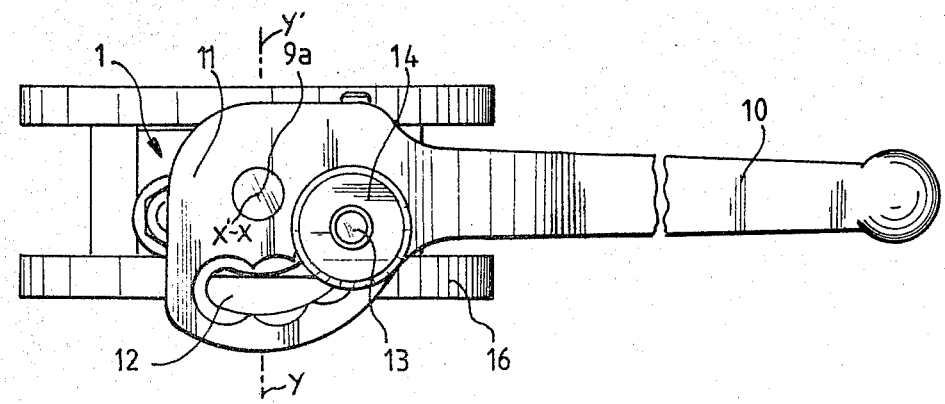
FIG. 2 is a top view of the valve.
Figure 4:
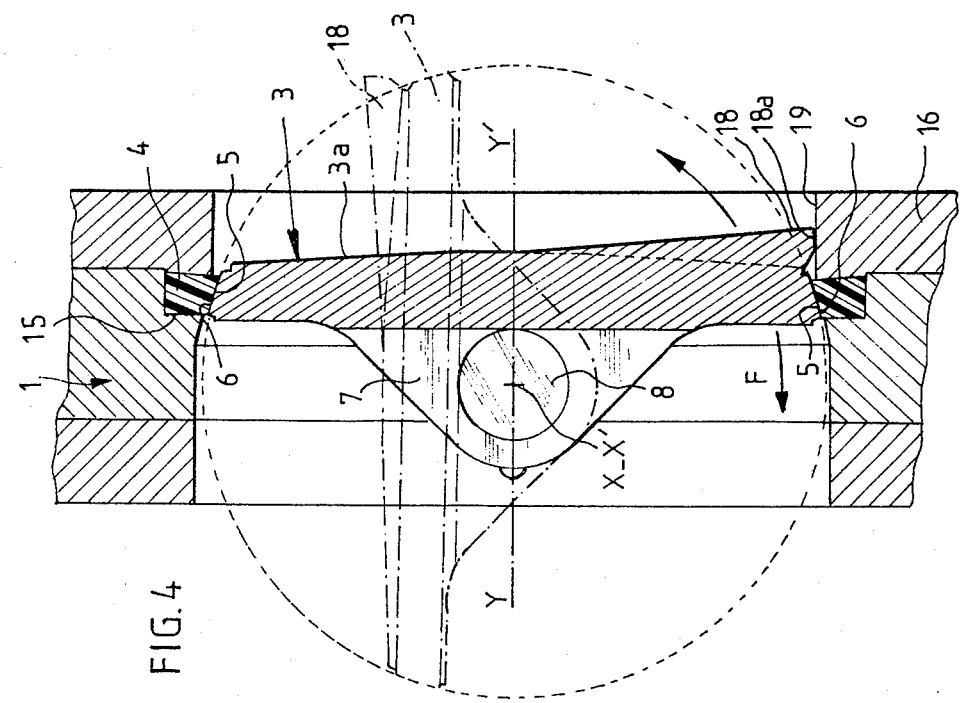
FIG. 4 is a sectional view along the plane IV—IV of FIG. 3.
Figure 3:
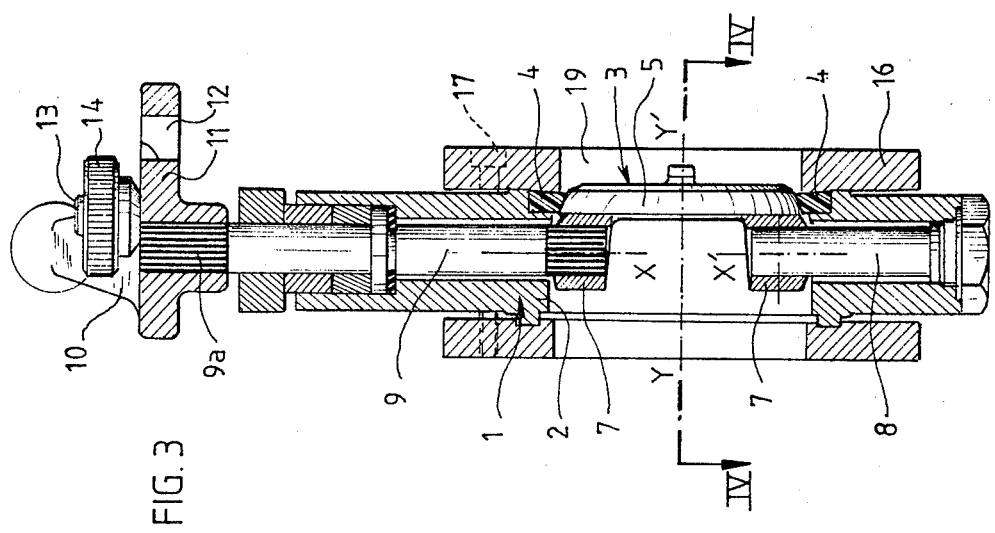
FIG. 3 is a part-sectional view in elevation taken along the plane III—III of FIG. 1.

In the embodiment shown in the accompanying figures, the butterfly valve comprises a valve body 1 traversed by a substantially cylindrical passageway 2 which is intended to be connected to external pipes (not shown in the drawings). Said valve body 1 contains a butterfly valve disk 3 which is rotatably mounted within the passageway 2 so as to be capable of pivotal motion about an axis X—X' at right angles to the axis Y—Y' of the passageway 2 (as shown in FIG. 2). The valve body 1 is fitted with an annular seal 4 which projects into the interior of the passageway 2. The valve disk 3 is provided with a peripheral annular bearing surface 5 applied against the sealing surface 6 of the valve seal 4 in the position of closure of the disk as shown in FIGS. 3 and 4, said sealing surface being intended to serve as a valve seat.

The annular bearing surface 5 of the valve disk 3 is a portion of spherical surface, the center of which is located substantially at the intersection of the axis of rotation X—X' of the valve disk 3 and of the axis Y—Y' of the passageway 2.

In the example illustrated, the valve disk 3 is attached by means of two lugs 7 to two rods 8, 9 mounted within the valve body 1 so as to be capable of rotating about the axis X—X'. The valve disk 3 is thus displaced laterally with respect to its axis of rotation.

The end of the rod 9 is connected to an operating lever 10. Said lever 10 is provided at the end adjacent to the rod a with a flange 11 having an opening 12 which extends along a circular arc centered on the rod 9 (as shown in FIG. 2). A stud 13 is attached to the valve body 1 and engaged within said opening 12. A nut 14 screwed on said stud serves to lock the operating lever 10 in the fully open, partly open, or closed position (as shown in FIGS. 1 and 2).

In the embodiment shown, the annular seal 4 is of polytetrafluoroethylene and is housed between an annular shoulder 15 of the valve body 1 and an outer ring 16 (shown in FIGS. 3 and 4) which is tightly applied against said valve body 1 along the axis Y—Y' of the passageway 2 by means of screws 17.

Figure 1:
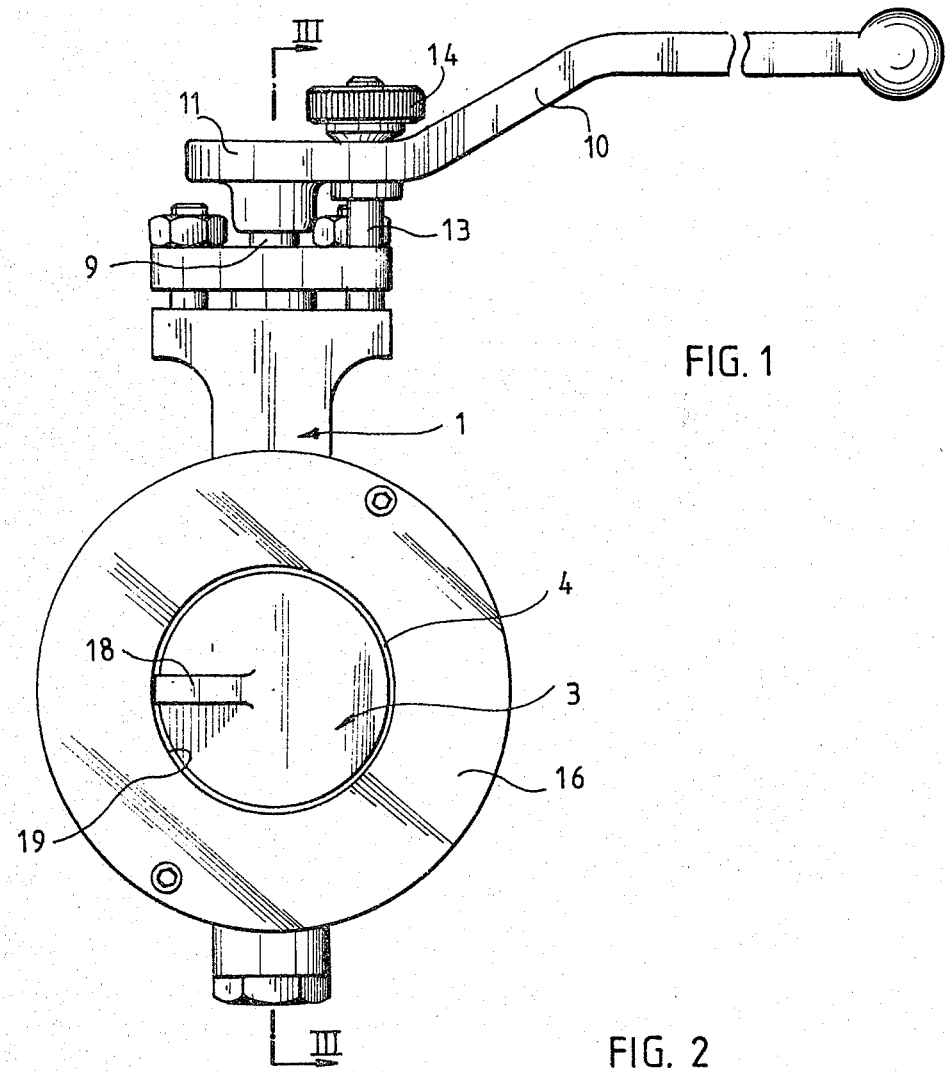
FIG. 1 is a view in elevation of a butterfly valve in accordance with the invention, this view being taken along the axis of the passageway formed within the valve body.

In accordance with the invention, the valve disk 3 is adapted to carry a stop 18 which is applied against the internal surface 19 of the ring 16 when the valve disk 3 is in the fully closed position as shown in FIGS. 1, 3 and 4. Said stop 18 thus prevents rotation of the valve disk 3 beyond its normal position of closure, that is to say in the direction of the arrow F indicated in FIG. 4.

Said stop 18 is formed on that face 3a of the valve disk 3 which is remote from its axis of rotation X—X'. Furthermore, said stop forms a projection with respect to the sphere S (shown in dashed outline in FIG. 4) on which the annular bearing surface 6 of the seal 4 is located. Moreover, the valve-disk stop 18 is located at an angle of 90° with respect to the axis of rotation X—X' of the valve disk 3. In addition, said stop is constituted by an elongated boss extending radially on the face 3a of the valve disk 3 and having a streamlined profile.

The boss constituting the stop 18 is formed by molding or forging at the same time as the valve disk as a whole; the state of surface of the face 3a and of the boss of the stop 18 can remain in the rough-molded or rough-cast state. Only the end 18a of the stop 18 which is intended to bear on the internal surface 19 of the ring 16 may call for a grinding operation so that this end bearing surface should correspond exactly to the fully closed position of the valve disk 3 by reason of the progressive engagement of the portions 18 and 19.

The technical effects and advantages of the stop 18 will now be discussed.

The valve-disk stop 18 serves to prevent rotation of the disk 3 in the direction of the arrow F (as shown in FIG. 4) beyond the fully closed position of the valve disk 3. This accordingly has the effect of preventing any damage to the seal 4. Indeed it is apparent that, if the stop were not present, the valve disk could be forcibly displaced to a point beyond its normal position of closure as indicated in FIG. 4, which would then be liable to subject the frusto-conical surface 6 of the seal 4 to forces exceeding the permissible limit of elasticity in the case of polytetrafluoroethylene, thus resulting in permanent creep deformation of the surface of said seal. Thus the seal would lose its effectiveness and would no longer be leak-tight.

In this respect, the stop constituted by the stud 13 engaged within the arcuate opening 12 of the operating lever 10 is ineffective since the angular position of the lever 10, the angular position of this stud-stop with respect to the valve disk 3, and the normal position of closure of the disk, cannot be obtained with a high degree of accuracy and in a reproducible manner under conditions of large-scale production. Moreover, these positions may be modified accidentally in the event of an error in assembly of the rod or after disassembly and reassembly of the valve.

The arrangement of the stop 18 on the face 3a of the valve disk 3 is particularly judicious since it does not introduce any complication in the construction of the disk. In fact, said stop can be formed by molding at the same time as the valve disk and its state of surface does not call for any particular care. Furthermore, in the open position of the valve, the stop 18 in no way interferes with the flow of fluid within the passageway 2. In fact, when the valve disk 3 is in the fully open position as shown in chain-dotted lines in FIG. 4, the stop 18 is oriented parallel to the direction of flow and thus does not constitute any appreciable obstacle for the fluid.

Moreover, by reason of the fact that the stop 18 is molded at the same time as the valve disk 3, the stop is in no way liable to become detached from the valve and thus cause damage to this latter or to any other component located downstream of the valve.

As will readily be understood, the invention is not limited to the example of construction described in the foregoing and many modifications may accordingly be contemplated without thereby departing either from the scope or the spirit of the invention.

Thus the invention is applicable to butterfly valves which are fitted with seals of any material other than polytetrafluoroethylene and which would have been liable to sustain damage in valves of the prior art when the valve disk was accidentally caused to rotate beyond its normal position of closure.

Furthermore, the stop could also be fitted with a member for adjusting the end-of-travel position, such as a screw having a very small pitch and fitted with a nut for locking in position.

Alternatively, the active portion of the stop could be provided with a damping shoe of polytetrafluoroethylene, for example.

Provision could also be made for a counter-stop which could be adjustable within the body of the ring 16 in order to cooperate with the stop 18.

What is claimed is:

1. In a butterfly valve comprising a valve body, a passageway within said body, a butterfly valve closure disk rotatably mounted within said passageway about an axis located at right angles to the axis of the passageway, an annular seal carried by the body and projecting within the interior of said passageway, the valve disk being movable about said axis between an opening position and a closure position in which an annular bearing surface formed at the periphery of the valve disk bears on the seal, the annular bearing surface of the valve disk being a portion of the surface of a sphere the center of which is located substantially at the intersection of the axis of rotation of the valve disk and the axis of the passageway; the improvement in which the valve disk carries a stop which is so positioned as to be in abutment against an internal surface of the valve other than said annular seal when the valve disk is in the closure position.

2. A butterfly valve according to claim 1, the valve disk being displaced laterally with respect to its axis of rotation, wherein the stop is formed on that face of the valve disk which is remote from its axis of rotation, and said stop forms a projection with respect to the sphere of which the annular bearing surface is a portion.

3. A butterfly valve according to claim 1, wherein the seal is inserted between an annular shoulder of the valve body and a ring applied against the valve body at one axial end of the passageway through the body, said ring having a face facing the shoulder and an internal face, and wherein the relative positions of the stop and of the ring are such that said stop bears on the internal surface of said ring when the valve disk is in the closure position.

4. A butterfly valve according to claim 1, wherein the annular seal has a base of polytetrafluoroethylene and has a frusto-conical sealing surface which is substantially tangent to the spherical annular bearing surface of the valve disk in the closed position.

5. A butterfly valve according to claim 1, wherein the stop is located at an angle of 90° with respect to the axis of rotation of the valve disk.

6. A butterfly valve according to claim 2, wherein the stop is constituted by an elongated boss.

7. A butterfly valve according to claim 1, wherein the stop is formed by molding at the same time as the valve disk.

* * * * *